US 9,182,651 B2

(12) United States Patent
Hitosuga

(10) Patent No.: US 9,182,651 B2
(45) Date of Patent: Nov. 10, 2015

(54) IMAGE PICKUP APPARATUS FOR CORRECTING AN IN-FOCUS POSITION

(75) Inventor: Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 13/446,750

(22) Filed: Apr. 13, 2012

(65) Prior Publication Data

US 2012/0274832 A1 Nov. 1, 2012

(30) Foreign Application Priority Data

Apr. 28, 2011 (JP) ................. 2011-100801

(51) Int. Cl.
*G03B 13/36* (2006.01)
*H04N 5/232* (2006.01)
*G03B 17/14* (2006.01)

(52) U.S. Cl.
CPC ............... *G03B 13/36* (2013.01); *G03B 17/14* (2013.01); *H04N 5/23212* (2013.01); *G03B 2206/00* (2013.01)

(58) Field of Classification Search
CPC ....................... H04N 5/23293; H04N 2101/00
USPC ..................................................... 348/333.11
See application file for complete search history.

(56) References Cited

U.S. PATENT DOCUMENTS

| | | | |
|---|---|---|---|
| 8,643,759 B2 * | 2/2014 | Irie | 348/333.09 |
| 2004/0179129 A1 * | 9/2004 | Okawara | 348/349 |
| 2008/0118238 A1 * | 5/2008 | Sogawa et al. | 396/128 |
| 2008/0176598 A1 * | 7/2008 | Hur | 455/556.1 |
| 2012/0092516 A1 * | 4/2012 | Hata | 348/222.1 |

FOREIGN PATENT DOCUMENTS

| | | |
|---|---|---|
| CN | 1506743 A | 6/2004 |
| CN | 101459776 A | 6/2009 |
| JP | 2000-075198 A | 3/2000 |
| JP | 2000-075352 A | 3/2000 |
| JP | 2000-292684 | 10/2000 |
| JP | 2001-174690 A | 6/2001 |
| JP | 2001-215401 A | 8/2001 |
| JP | 2002-214518 A | 7/2002 |

(Continued)

OTHER PUBLICATIONS

The above foreign patent documents were cited in a Dec. 1, 2014 Chinese Office Action, which is enclosed with an English Translation, that issued in Chinese Patent Application No. 201210135147.2.

(Continued)

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

An image pickup apparatus arranged to set a correction value for adjusting a focus position obtained by a predetermined detection method at a time of photographing, is arranged such that if a limitation processing is executed with respect to selection of an AF frame at the time of photographing, a display manner at the time of selection of an AF frame which is to be used when the correction value is set and stored is made different between a selectable AF frame and an unselectable AF frame or is made by applying the same limitation as the limitation processing at the time of photographing.

11 Claims, 10 Drawing Sheets

(56) References Cited

FOREIGN PATENT DOCUMENTS

| JP | 2009-198887 A | 9/2009 |
|----|---------------|--------|
| JP | 2009-210872 A | 9/2009 |
| JP | 2010-134026 A | 6/2010 |

OTHER PUBLICATIONS

The above foreign patent documents were cited in the Feb. 17, 2015 Japanese Office Action, which is enclosed without an English Translation, that issued in Japanese Patent Application No. 2011-100801.

* cited by examiner

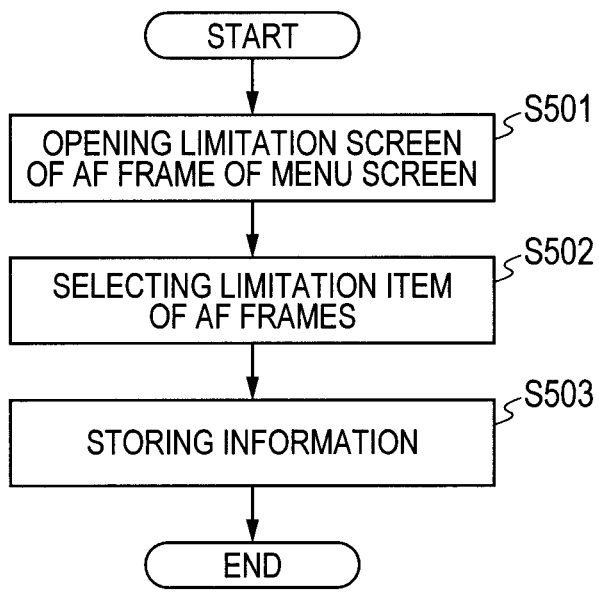
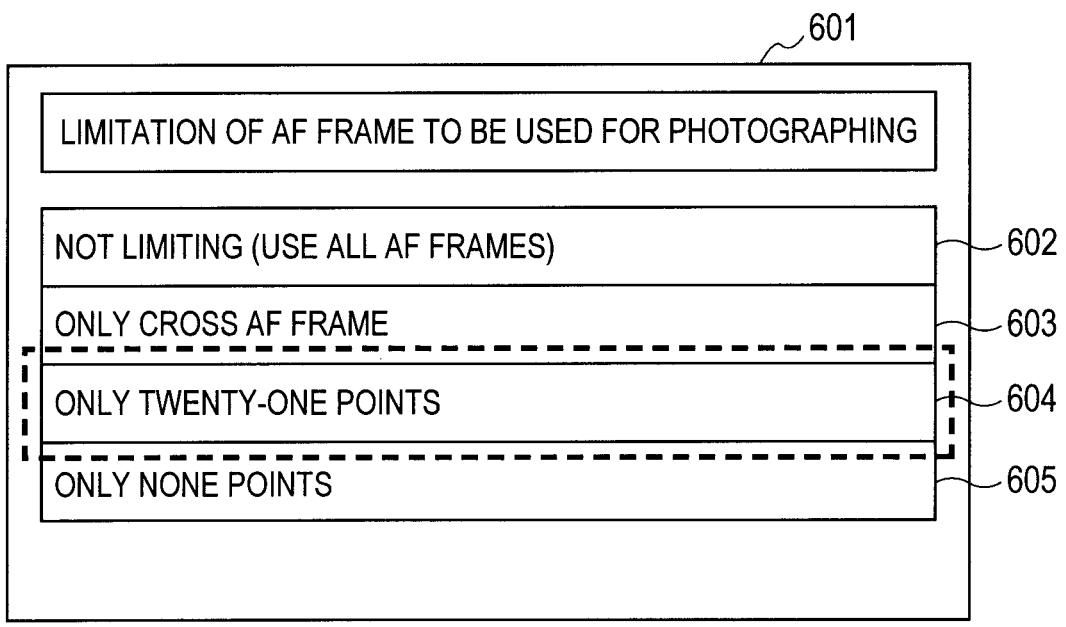

IMAGE PICKUP APPARATUS FOR CORRECTING AN IN-FOCUS POSITION

BACKGROUND OF THE INVENTION

1. Field of the Invention

The present invention relates to an image pickup apparatus having a function for correcting an in-focus position detected by a phase difference AF (autofocus) method or the like.

2. Description of the Related Art

In the related art, in a single lens reflex camera which is arranged to attain an in-focused state by the phase difference AF, there is a case where in association with long-time use of the camera, a position which is recognized as an in-focus position is changed due to long-time use of each of a lens and a camera body and an in-focus precision deteriorates to a level lower than an initial precision. In the case of the lens, a case where while the lens is driven to a correct in-focus position, a lens stop position may be shifted from the correct position due to a mechanical deterioration caused by long-time use of a camera is considered. In the case of the camera body, there is considered a case where a mirror which is used in a phase difference detection method is driven many times so that an angle of the mirror is gradually changed and this causes change of an angle at which incident object light is guided to an AF sensor so that a position shifted from the correct in-focus position is recognized as an in-focus position. In the foregoing case, a unit for shifting the in-focus position to an original state without allowing the user to bring the camera to a service center has been installed in a recent image pickup apparatus.

In the detection of the in-focus position by the phase difference AF, there is a case where the correct in-focus position cannot be detected by an influence by colors, types, and the like of a light source and a photographing object. If such a problem occurs, such a technique that the detected in-focus position is corrected by the phase difference AF in accordance with an environment where the camera is used is considered. At this time, in a construction in which there are a plurality of focus adjustment areas (AF frames) for the phase difference AF, there is a case where the correction is necessary every AF frame or the like. However, if the number of portions to be corrected increases, there raises an actual problem such that it is difficult for a user to spend time to make individual correction each time the correction is necessary. Therefore, the user wants to correct in accordance with the AF frame which the user wants to use by himself. The Japanese Patent Application Laid-Open No. 2000-292684 discloses a function (AF calibration) which can automatically correct the in-focus position of the phase difference AF by using a contrast detection method. A correction value can be held every focal length.

However, in the technique disclosed in the above patent literature, in the case where there are a plurality of AF frames for the phase difference AF, there is not a control technique about how to select the AF frame which is used for correction of the in-focus position by the phase difference AF when a limitation processing of a selection of the AF frames is executed at the time of photographing.

SUMMARY OF THE INVENTION

A scope of the invention is to provide an image pickup apparatus in which there is installed such a comfortable AF correction processing function that in the case where a limitation processing of a selected AF frame is set at the time of photographing, even at the time of an AF correction processing, a selectable AF frame and an unselectable AF frame are displayed in a different display manner, or even in the AF frames for the AF correction processing, only the AF frame which is made selectable by a limitation processing at the time of photographing is enabled to be selected, so that the apparatus can be easily operated by the user.

To accomplish the above object of the invention, an image pickup apparatus of the invention which is arranged to set a correction value for adjusting a focus position obtained by a predetermined detection method at a time of photographing is arranged such that a limitation processing of the AF frame which is used at the time of photographing is executed to a plurality of AF frames serving as focus adjustment areas which are selectable when an autofocus by the predetermined detection method is performed. In the case where the limitation processing is executed with respect to the selection of the AF frame at the time of photographing, a display manner at the time of selection of the AF frame which is to be used when the correction value is set and stored, is made different between a selectable AF frame and an unselectable AF frame. Or, in the case where the limitation processing is executed with respect to the selection of the AF frames at the time of photographing, the same limitation as the limitation processing is applied even to the display at the time of selection of the AF frame which is to be used when the correction value is set and stored.

Further features of the present invention will become apparent from the following description of exemplary embodiments with reference to the attached drawings.

BRIEF DESCRIPTION OF THE DRAWINGS

FIG. 4 is a flowchart for an AF frame limitation processing in the embodiment.

FIG. 5 is a diagram illustrating an example of a display screen of the AF frame limitation processing in the embodiment.

DESCRIPTION OF THE EMBODIMENTS

The gist of the present invention lies in that in an image pickup apparatus which can set a correction value for adjusting a focus position obtained by a predetermined detection method, in the case where a limitation processing is executed with respect to an AF frame selection at the time of photographing, when an AF frame of a calibration is selected, the AF frame is displayed in a manner corresponding to the limitation. That is, a selectable AF frame and an unselectable AF frame are displayed in a different display manner, or the AF frame is displayed by applying the same limitation as the limitation processing. In the case of displaying the AF frame by applying the same limitation, the selectable AF frame and the unselectable AF frame are displayed in such a different display manner that the AF frame which is unselectable in the limitation processing is disabled to be selected and displayed as a selected calibration frame (refer to the second embodiment, which will be described hereinafter). However, the invention is not limited to such an example but can be also constructed as follows. That is, all AF frames are displayed in the same display manner and even if the unselectable AF frame which is unselectable in the limitation processing is selected, it can be disabled to be selected and displayed as the selected calibration frame.

Exemplary embodiments of the present invention will be described in detail hereinbelow with reference to the drawings.

First Embodiment

Figure 1A:
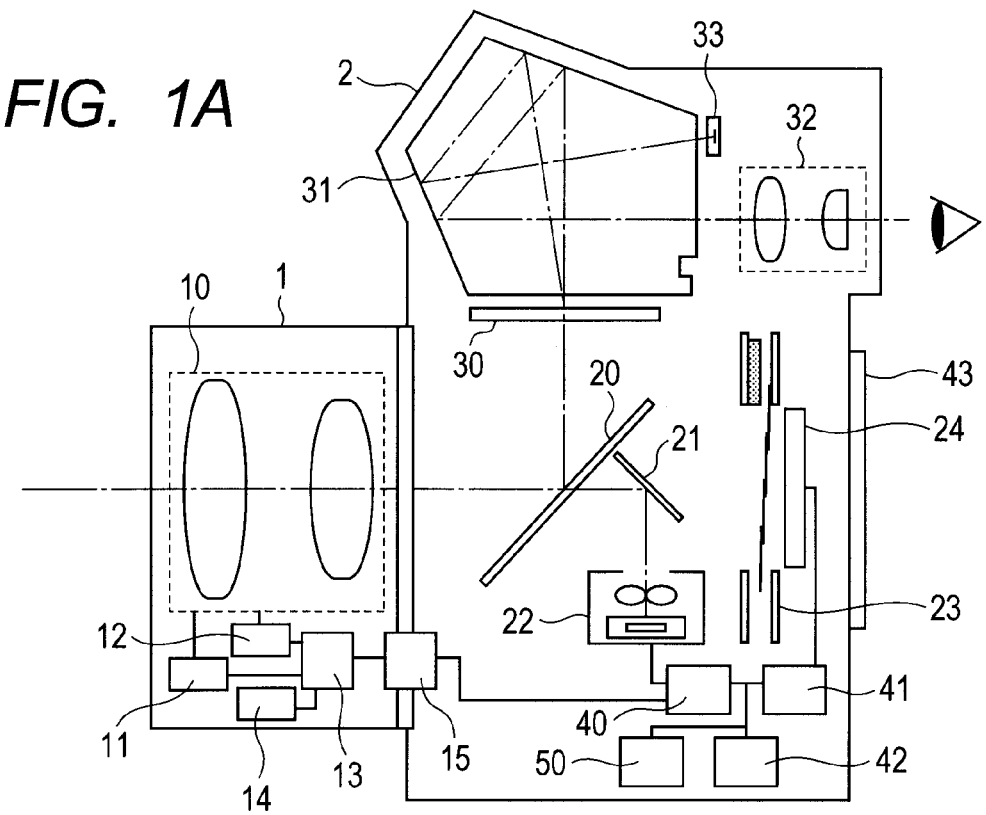
FIGS. 1A and 1B are vertical sectional views illustrating internal structures of a single lens reflex digital camera as an image pickup apparatus in a mirror-down state and a mirror-up state.
Figure 1B:
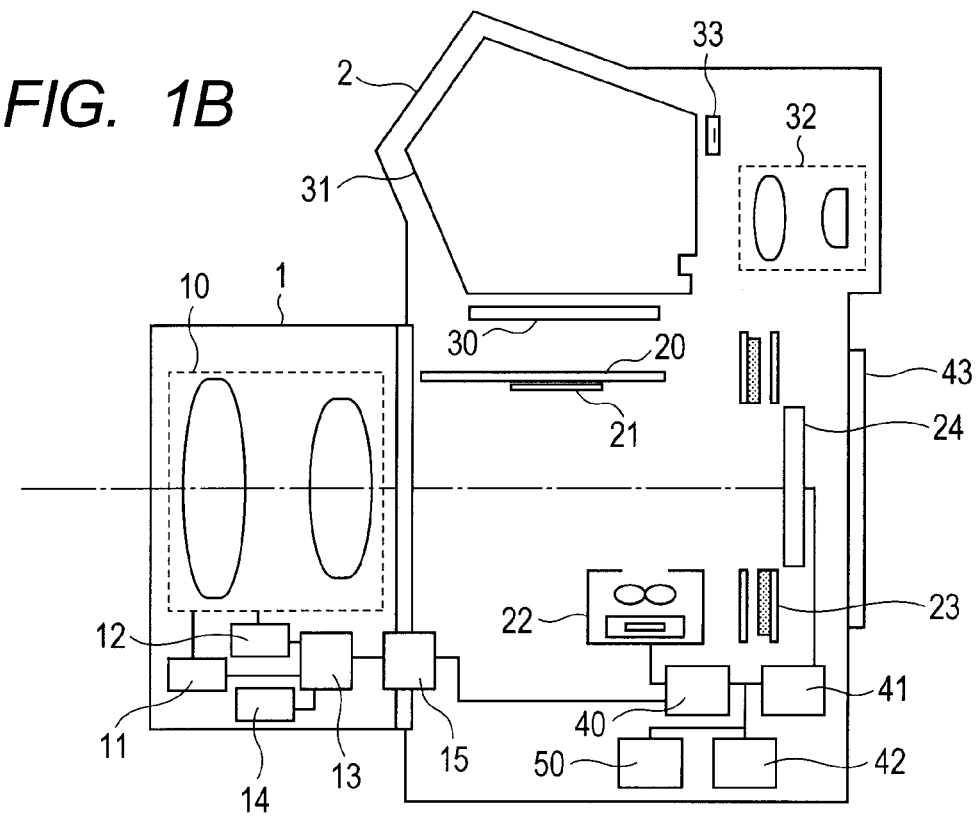

A lens-interchangeable digital single lens reflex camera system will now be described as a first embodiment of the invention. FIGS. 1A and 1B are schematic vertical sectional views of a camera serving as an image pickup apparatus of the embodiment. An image pickup optical system 10 enclosed in a lens body 1 is constructed by one lens or a group of a plurality of lenses. By moving all or a part of the lenses, a focal length (zoom position) or a focus position (focus adjustment state) can be changed. A lens drive unit 11 adjusts the focus adjustment state by moving all or a part of the lenses of the image pickup optical system 10. The lens drive unit 11 is constructed by, for example, a DC motor or a stepping motor and adjusts an in-focus state by changing a position of a focus lens enclosed in the lens body 1 by control of a microcomputer 40. A lens state detection unit 12 detects the focal length, that is, the zoom position of the image pickup optical system 10 and the focus position. A lens control unit 13 controls the whole lens body 1 including a lens storage unit 14 constructed by a ROM or the like. A contact 15 is provided for the lens body 1 and a camera body 2. In a state where they are mutually attached, various kinds of information is communicated and a power source is supplied through the contact 15.

A main mirror 20 is constructed by a half mirror and can be rotated in accordance with an operation state of the camera. When the user observes an object (to be photographed) by a viewfinder, as illustrated in FIG. 1A, the main mirror 20 is arranged diagonally across a photographing optical path so that a light flux from the lens body 1 turns at the main mirror 20 to be guided to a viewfinder optical system, which will be described hereinafter. At the time of photographing or live view, as illustrated in FIG. 1B, the main mirror 20 is withdrawn from the photographing optical path so as to guide the light flux from the lens body 1 to an image pickup element 24, which will be described hereinafter. A sub-mirror 21 is rotated together with the main mirror 20. When the main mirror 20 is arranged diagonally across the photographing optical path, as illustrated in FIG. 1A, the sub-mirror 21 turns the light flux which passed through the main mirror 20 so as to be guided to an AF sensor 22 (arranged in a focus detection unit 109), which will be described hereinafter. At the time of photographing or live view, as illustrated in FIG. 1B, the sub-mirror 21 is rotated together with the main mirror 20 and is withdrawn from the photographing optical path. The AF sensor 22 is constructed by a secondary focus lens, an area sensor consisting of a plurality of CCDs or CMOSs, and the like and performs a focus detection by a phase difference method serving as a well-known method. That is, the AF sensor 22 constructs a unit that executes an autofocus function (1, 10, 22, 40) by the phase difference detection method together with the lens body 1 and the mechanism control unit 40, which will be described hereinafter.

A shutter 23 is provided to control incidence of the light flux from the lens body 1 to an image pickup element 24, which will be described hereinafter. Generally, the shutter 23 is in a closed state as illustrated in FIG. 1A. At the time of photographing or live view, the shutter 23 enters an open state as illustrated in FIG. 1B. The image pickup element 24 is constructed by an image sensor and its peripheral circuit. An image sensor CCD, a CMOS sensor, or the like is used as an image pickup element 24. The image pickup element 24 converts an object image formed by the image pickup optical system 10 into an electric signal. A focus plate 30 is arranged on a primary focus plane of the lens body 1. A condensing lens is arranged on an incident plane. The object image (viewfinder image) is formed on an exit plane. A penta prism 31 is provided to change a viewfinder optical path and corrects the object image formed on the exit plane of the focus plate 30, to provide an erect normal image. An eyepiece 32 is constructed in such a manner that when the user looks in the viewfinder, it can adjust visibility so as to fit to human eyes. An optical system constructed by the focus plate 30, penta prism 31, and eyepiece 32 is called a viewfinder optical system. An AE sensor 33 is constructed by a photodiode corresponding to each area in a plurality of divided image pickup areas, and measures a brightness of the object image formed on the exit plane of the focus plate 30.

The mechanism control unit 40 is a microcomputer (central processing unit: MPU) for controlling the camera unit and the whole camera. The mechanism control unit 40 also makes lens control such as AF correction, lens driving, iris driving, and the like to the lens body 1. A digital control unit 41 is a memory controller (ICU) for making various kinds of control of the image data. The digital control unit 41 can be constructed by including a focus detection unit of a contrast method for detecting a contrast of an image photographed by the image pickup element 24 and discriminating the in-focus position. That is, the digital control unit 41 constructs a unit that executes an autofocus function by a contrast detection method together with the lens body 1 and the mechanism control unit 40. Setting values for making various kinds of control in the AF correction system, adjustment data, and the like are stored in a camera storage unit 42.

A liquid crystal monitor 43 serving as a display member using a TFT, an organic EL, or the like displays the photographed image and various kinds of photograph information. A recording medium 50 records image data stored in a memory card, a hard disk, or the like. The recording medium 50 is arranged so as to be detachable to/from the camera body. Although not illustrated in FIGS. 1A and 1B, a SET button and a cancel button are provided. If the SET button is displayed on the liquid crystal monitor 43, the user can execute the operation such as decision, selection, or the like by depressing the SET button. If the cancel button is displayed on the liquid crystal monitor 43, the user can execute the operation to return the display screen to a precedent state by one, the operation to finish a specific mode, or the like by depressing the cancel button.

Figure 2:
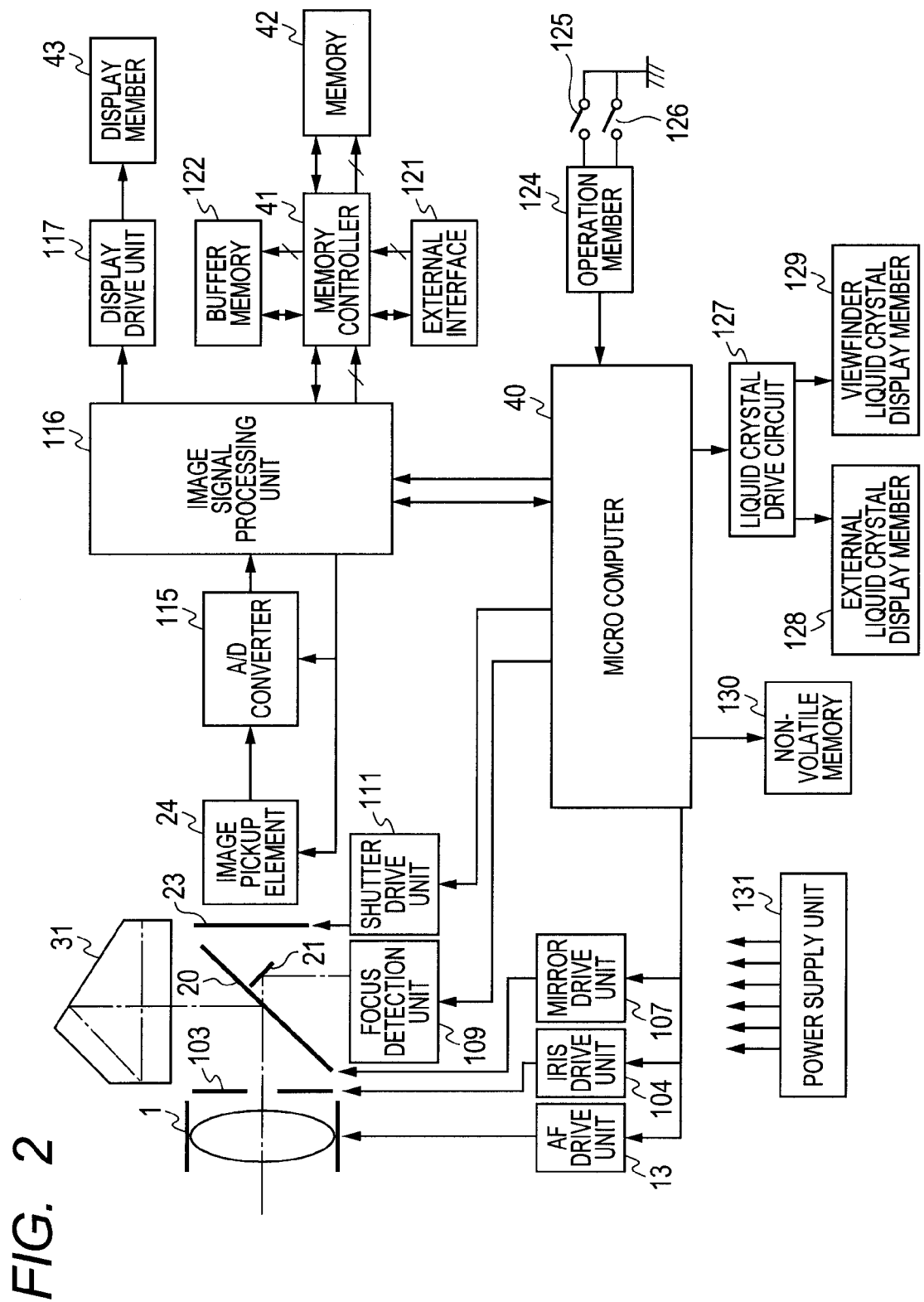
FIG. 2 is a block diagram illustrating a construction of the image pickup apparatus according to an embodiment.

A description will be further made by using FIG. 2 as a block diagram illustrating the construction of the image pickup apparatus according to the embodiment. In FIG. 2, component elements similar to those illustrated in FIGS. 1A and 1B are designated by the same reference numerals. In FIG. 2, an iris 103 and an iris drive unit 104 to drive the iris 103 are provided. A drive amount of the iris 103 to be driven is calculated by the microcomputer 40, thereby changing an optical aperture value. A mirror drive unit 107 drives the main mirror 20 by the control of the microcomputer 40. The focus detection unit 109 is provided. The light flux which passes through a center portion of the mirror 20 and is reflected by the sub-mirror 21 reaches the AF sensor 22 which is arranged in the focus detection unit 109 and used to perform a photo-electric conversion. A defocus amount which is used for a focus arithmetic operation is obtained by arithmetically operating an output of the AF sensor 22. The microcomputer 40 evaluates a result of the arithmetic operation and instructs the AF drive unit 13 serving as a lens control unit so as to drive a focus lens.

A shutter drive unit 111 drives a focal plane shutter 23. An aperture open time of the shutter is controlled by the microcomputer 40. An A/D converter 115 converts an analog output signal of the image pickup element 24 into a digital signal. An image signal processing unit 116 is realized by a logic device such as a gate array or the like. A display drive unit 117 is provided. An external interface 121 can be connected to a computer or the like. A buffer memory 122 is provided.

The image signal processing unit 116 executes a filtering processing, a color conversion processing, and a gamma processing to the digital image signal, forms development data, executes a compression processing such as a JPEG or the like, and outputs a resultant signal to the memory controller 41. The image signal processing unit 116 also simultaneously executes an addition of two or more development data stored in the buffer memory 122, a generation of high precision data provided by using the larger number of bits of gradation from the development data, or both of those processings and can store a processing result into the buffer memory 122 again. Further, the image signal processing unit 116 can also output the image signal from the image pickup element 24 or the image signal which is contrarily input from the memory controller 41 to the display member 43 through the display drive unit 117. The switching of those functions is performed by an instruction from the microcomputer 40. The image signal processing unit 116 can also output exposure information of the signal of the image pickup element 24 and information such as a white balance or the like to the microcomputer 40 in accordance with necessity. On the basis of those information, the microcomputer 40 instructs a white balance and a gain adjustment. In the case of a continuation photographing operation, photographed data is temporarily stored in the buffer memory 122 as an image non-subjected to the image processing, the image data non-subjected to the image processing is read out through the memory controller 41, the image processing and compression processing are executed in the image signal processing unit 116, and the continuation photographing is executed. The number of continuously-photographable pictures depends on a capacity of the buffer memory. The memory controller 41 stores the digital image data which is non-subjected to the image processing and is input from the image signal processing unit 116 into the buffer memory and stores the image data subjected to the image processing into the memory 42. On the contrary, the image data is output from the buffer memory 122 or the memory 42 to the image signal processing unit 116. There is also a case where the memory 42 may be arranged so as to be detachable. The memory controller 41 can output the image stored in the memory 42 through the external interface 121 which can be connected to the computer or the like. Particularly, the image signal processing unit 116 constructs a unit for executing a live view function together with the image pickup optical system 10, the image pickup element 24, or the like.

A photographing operation member 124 informs the microcomputer 40 of a state of the photographing operation member 124. The microcomputer 40 controls each unit in accordance with a change of the operation member. A switch 1 (also referred to as SW1) 125 and a switch 2 (also referred to as SW2) 126 are provided. Each of the switches SW1 and SW2 is a switch which is turned on and off by operating a release button and is one of input switches of the photographing operation member 124. A state where only the switch SW1 is ON is a release button half-depression state. In this state, the autofocus operation is executed and the photometry operation is also executed. A state where both of the switches SW1 and SW2 are ON is a release button full-depression state and is a release button ON state for recording an image. In this state, the photographing is executed. While the switches SW1 and SW2 are held to be ON, the continuation photographing operation is executed. In addition to those switches, the following switches are connected to the operation member 124: a main switch; a photographing mode dial; a menu button; a set button; a reproduction switch; an information display button regarding the photographing and the reproduction; and the like. A state of each of the above switches is detected. A movement + (plus) button and a movement − (minus) button for a menu and a reproduced image movement can be also connected to the operation member 124. Owing to those functions, a numerical value and a function can be more easily selected by providing a rotation dial switch. A liquid crystal display unit 127, an external liquid crystal display member 128, and a viewfinder liquid crystal display member 129 are provided. In response to a display content command from the microcomputer 40, the liquid crystal display unit 127 drives the external liquid crystal display member 128 and the viewfinder liquid crystal display member 129 for displaying an operation state, message, and the like by using characters and image. Back light such as an LED or the like (not shown) is arranged in the viewfinder liquid crystal display member 129. The LED is also driven by the liquid crystal display unit 127. On the basis of prediction value data of an image size, according to ISO sensitivity, image size, and image quality, which are set before the photographing, the microcomputer 40 can arithmetically operate the number of residual photographable images after confirming the capacity of the memory through the memory controller 41. The number of residual images can be also displayed on the external liquid crystal display member 128 and the viewfinder liquid crystal display member 129 in accordance with necessity. A non-volatile memory 130 can also store data even in a state where a power source of the camera is OFF. A power supply unit 131 supplies a power source necessary for each IC and a drive system.

Figure 3:
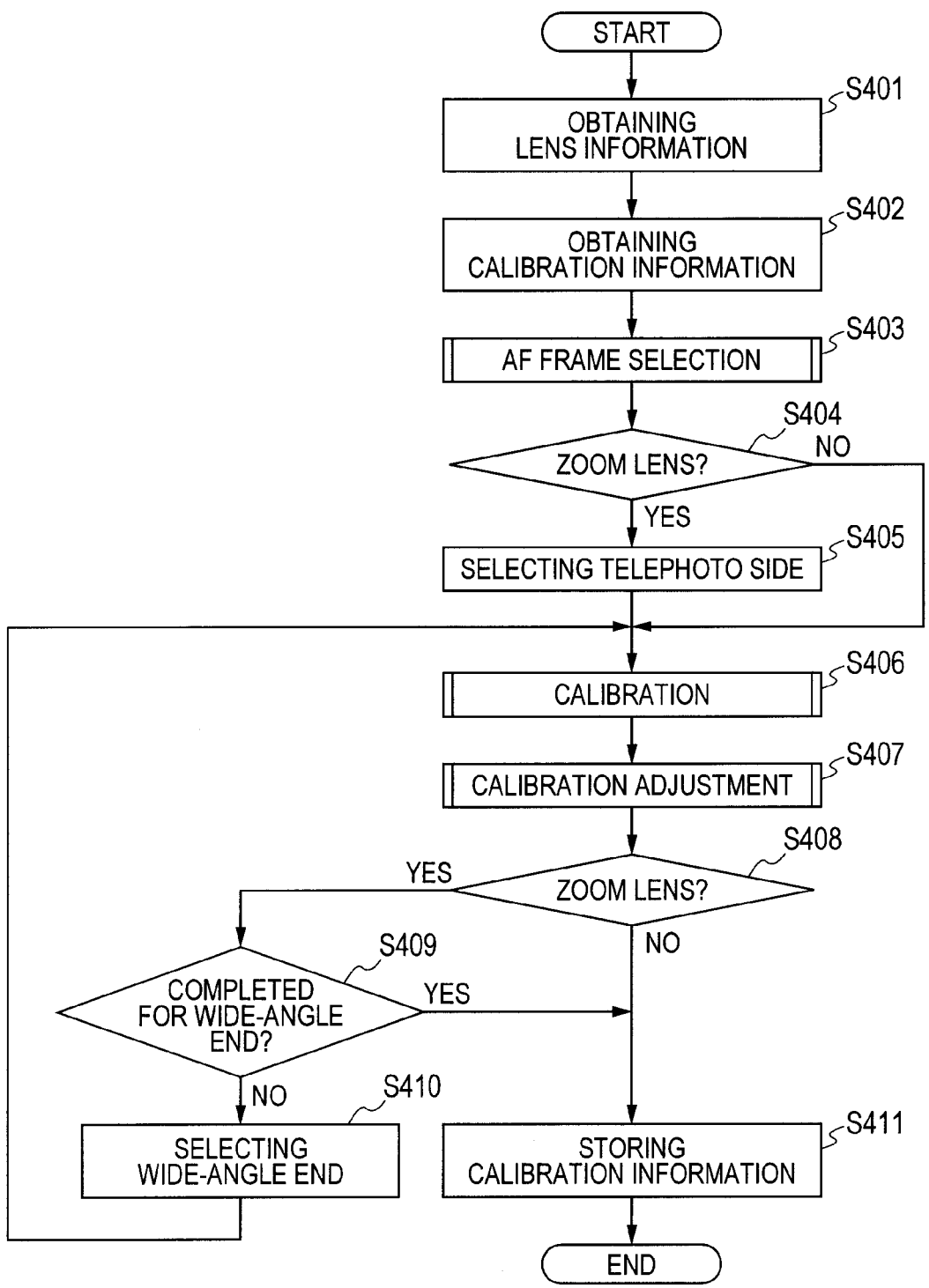
FIG. 3 is a flowchart for an AF calibration in the embodiment.

Subsequently, an example of a calibration processing will be described with reference to a flowchart illustrated in FIG. 3. The calibration processing is executed by a method whereby the mechanism control unit 40 executes a calibration program stored in the camera storage unit 42. In step S401, lens information is obtained by communication between the lens body 1 and the camera body 2 and the processing routine advances to step S402. The lens information includes a lens ID, a lens name, and a serial number. Although the lens information is obtained by communication between the lens body 1 and the camera body 2 here, it is also possible to arrange in such a manner that information is obtained by precedently performing the communication and stored in the camera storage unit (42) and the stored information is used. In step S402, calibration information including a correction value and the like corresponding to the lens information obtained in step S401 is obtained from the camera storage unit 42 and step S403 follows. If there is no calibration information corresponding to the lens information, the lens attached to the camera is regarded as a lens which is newly subjected to the calibration.

In step S403, the user is allowed to select an AF frame serving as a focus adjustment area where the calibration is performed, and step S404 follows. The processing for selecting the AF frame in step S403 will be described with reference to FIGS. 6 and 7. In step S404, whether or not the lens body 1 attached to the camera body 2 is a zoom lens or a fixed focal-length lens is discriminated. If it is determined in step S404 that the lens body 1 is the zoom lens, step S405 follows. If it is determined that the lens body 1 is the fixed focal-length lens, step S406 follows. In step S405, a telephoto end is selected. As for the selection of the telephoto end, if a zoom processing can be executed by a command from the camera, a command to set to the telephoto end from the camera is performed by the communication between the camera body 2 and the lens body 1, thereby allowing the camera to automatically drive the lens. If the zoom processing can be executed only manually, a display screen for promoting the user to manually set to the telephoto end is displayed, thereby allowing the user to drive the lens so as to be manually set to the telephoto end. After completion of the processing of step S405, step S406 follows.

In step S406, the calibration processing is executed. The calibration processing in step S406 will be described hereinafter with reference to FIGS. 8, 9, and 10. In step S407, the user finely adjusts a calibration result arithmetically operated in step S406. If the arithmetic operation result is satisfactory (OK), the user does not need to make the fine adjustment. A method of the fine adjustment in step S407 will be described hereinafter with reference to FIG. 11. In this manner, in the embodiment, the user can also manually adjust the correction value.

After completion of the processing of step S407, step S408 follows. In step S408, whether or not the lens body 1 is the zoom lens or the fixed focal-length lens is discriminated. A discriminating method in this instance is the same as that in step S404. If it is determined in step S408 that the lens body 1 is the zoom lens, step S409 follows. If it is determined that the lens body 1 is the fixed focal-length lens, step S411 follows. In step S409, whether or not a calibration of a wide-angle end of the lens is also performed is discriminated. If the calibration of the wide-angle end is also performed, step S411 follows. If the calibration of the wide-angle end is not performed, step S410 follows. In step S410, the user is allowed to select the wide-angle end. A processing similar to the processing for allowing the user to select the telephoto end in step S405 is executed. After completion of the processing of step S410, step S406 follows. In step S411, a calibration result obtained by the processings of steps S406 and S407 is stored in the camera storage unit 42.

In the embodiment, the selection processing of the telephoto end in step S405 is executed first and the processing of the wide-angle end in step S410 is executed later. However, the order of the processing may be reversed. Although the processing for storing the calibration results into the camera storage unit 42 is executed after both of the calibration result of the telephoto end and the calibration result of the wide-angle end are obtained, the calibration results may be stored into the camera storage unit 42 at a point of time when one of the calibration results is obtained.

Subsequently, an example of a limitation processing of the AF frame will be described by using a flowchart illustrated in FIG. 4 and an example of a display screen illustrated in FIG. 5. The limitation processing of the AF frame is a function provided for the camera, in which the number of AF frames at which the phase difference AF that is available at the time of photographing is performed is large. For example, in the case of a camera provided with 45 AF frames, there is a case where it is difficult for the user to immediately select the AF frame that may be frequently used at the time of photographing. Therefore, by executing the limitation processing of the AF frame (such a processing that even if the user tries to select the AF frame other than the selectable AF frames, the selection and display of such an AF frame are disabled), the AF frame that is frequently used can be rapidly selected at the time of photographing.

In step S501 in FIG. 4, an AF frame limitation screen of a setting screen by a menu is displayed on the liquid crystal monitor 43. The AF frame limitation screen is a display screen 601 as illustrated in FIG. 5. In step S502, the user selects limitation items of the AF frame. As limitation items, for example, there are the following items 602 to 605 as illustrated in FIG. 5. The items illustrated in FIG. 5 are an example and any items may be used so long as they limit the AF frame. An item 602 "not limiting (use all AF frames)" is an item showing that the limitation of the AF frames is not performed but all of the AF frames can be selected. An item 603 "only cross AF frame" is an item showing that only the AF frames in which a cross-type sensor is used can be selected. An item 604 "only twenty-one points" is an item showing that only twenty-one points can be selected from a plurality of stored AF frames. An item 605 "only nine points" is an item showing that only nine points can be selected from a plurality of AF frames. If a desired item is selected in step S502, information of the selected item is stored into the camera storage unit 42 in step S503.

Figure 6:
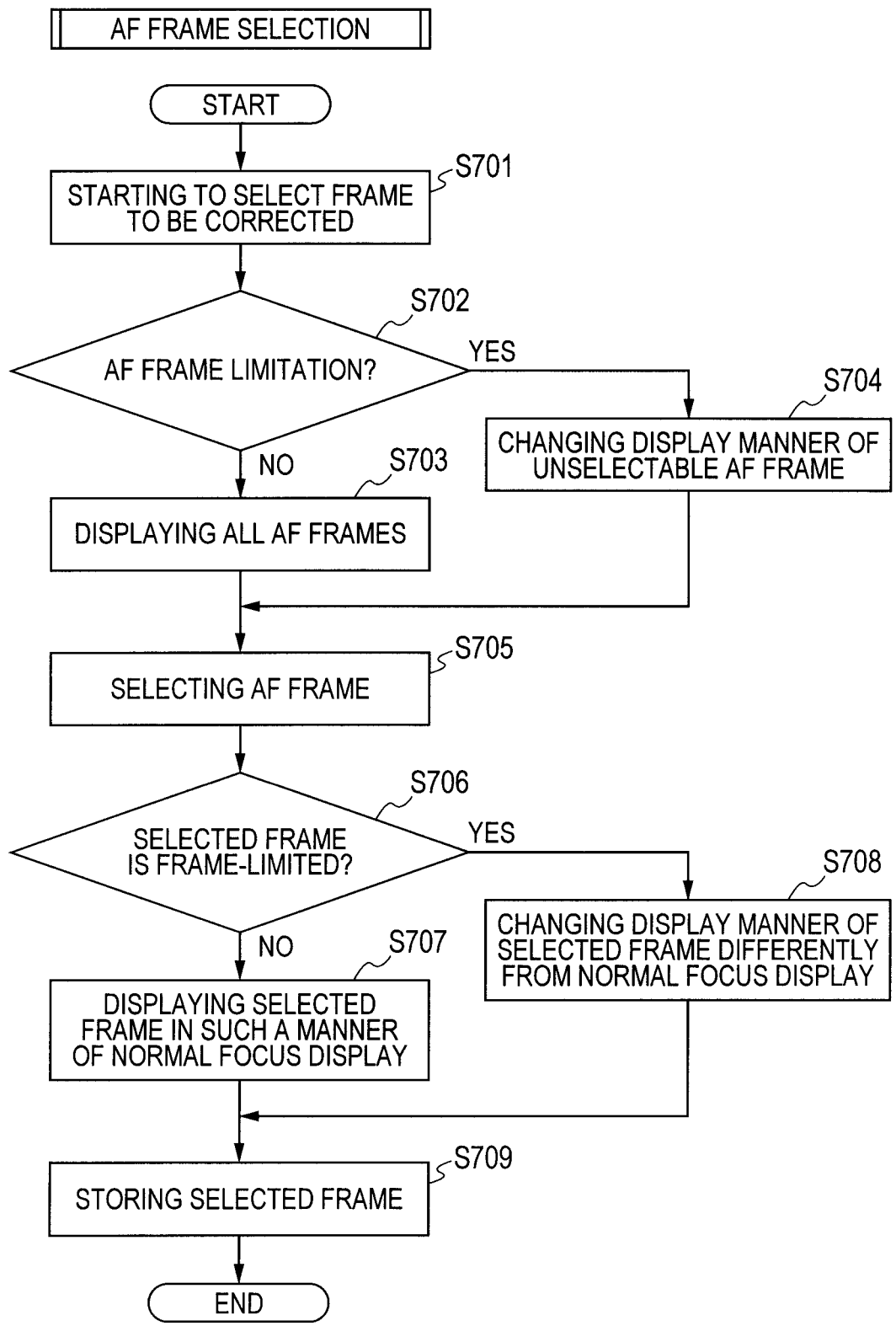
FIG. 6 is a flowchart for an AF frame selection of the AF calibration in the first embodiment.
Figure 7:
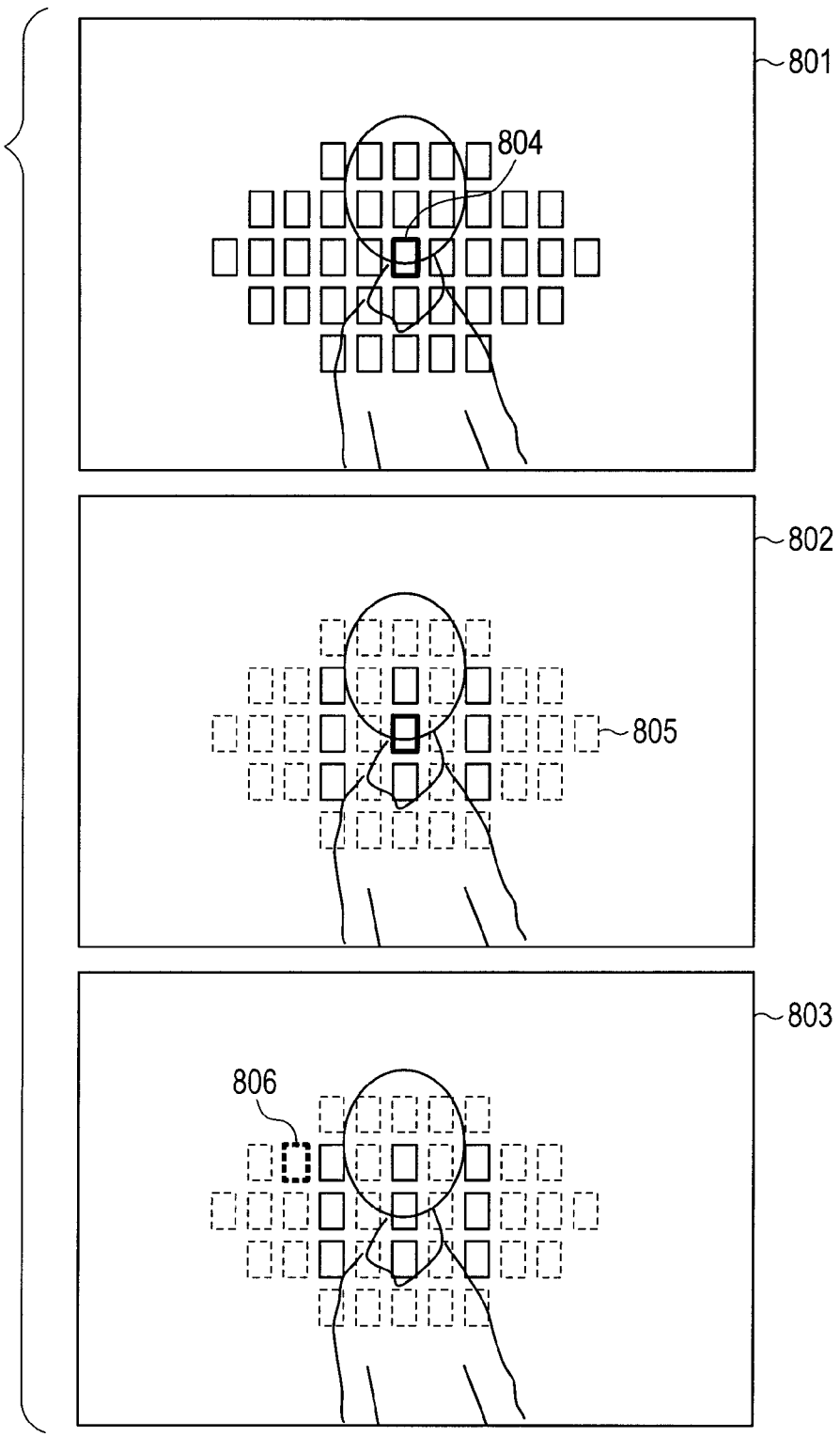
FIG. 7 is a diagram illustrating an example of a display screen of the AF frame selection of the AF calibration in the embodiment.

Subsequently, the processing for executing the AF frame selection in the AF calibration processing will be described with reference to a flowchart illustrated in FIG. 6 and an example of a display screen illustrated in FIG. 7. In this instance, the processing of step S403 in FIG. 3 will be described in detail. In step S701 in FIG. 6, the selection of the AF frame which is used in the calibration processing is started. In step S702, whether or not the AF frame limitation is performed is discriminated. The limitation processing of the AF frame is the processing described with reference to FIGS. 4 and 5. If it is determined in step S702 that the limitation processing of the AF frame is performed, step S704 follows. If it is determined in step S702 that the limitation processing of the AF frame is not performed, step S703 follows.

In step S703, a processing to display all of the AF frames is executed. When all of the AF frames are displayed, for example, a display screen 801 as shown in FIG. 7 is displayed. In step S704, a display manner of a limited unselectable AF frame at the time of photographing is changed. For example, a display screen 802 as shown in FIG. 7 is displayed. A display 805 in FIG. 7 indicates an unselectable AF frame at the time of photographing. Although a broken line is used in the example of 805, any display manner may be used so long as a fact that there is a change in display can be recognized. As another distinguishable display manner, for example, such a method that the color is changed, the unselectable AF frame is displayed in blinking, a line is thinned, or the like is considered. After completion of the processing of step S704, step S705 follows.

In step S705, the user selects the AF frame to be subjected to the AF calibration processing. If the user who has already determined the AF frame that is frequently used at the time of photographing selects the AF frame corresponding to the AF frame that is frequently used and performs the AF calibration, a possibility that a result of a better precision is obtained is high. When the AF frame is selected in step S705, by the processings of steps S703 and S704, the AF frame that is used at the time of photographing and the AF frame that is not used are visibly distinguishable. Therefore, the user can rapidly select the AF frame to be subjected to the AF calibration without a moment's hesitation.

After completion of the processing of step S705, step S706 follows. In step S706, whether or not the selected AF frame is the unselectable frame subjected to the AF frame limitation at the time of photographing is discriminated. If it is determined in step S706 that the limitation processing of the AF frame is performed, step S708 follows. If it is determined in step S706 that the limitation processing of the AF frame is not performed, step S707 follows. In step S707, the focusing used for normal selection is applied to the AF frame selected in step S705 (that is, the selected AF frame is displayed in blinking or its color is changed). For example, the selected AF frame is displayed by a solid line as shown at 804 in FIG. 8. On the other hand, in step S708, the AF frame selected in step S705 is displayed so as to indicate the unselectable AF frame at the time of photographing. For example, it is displayed by a broken line as shown at 806 in a display screen 803 of FIG. 8. If it is decided in step S709 that the calibration processing is performed to the selected AF frame, information of the selected AF frame is stored into the camera storage unit 42.

Figure 8:
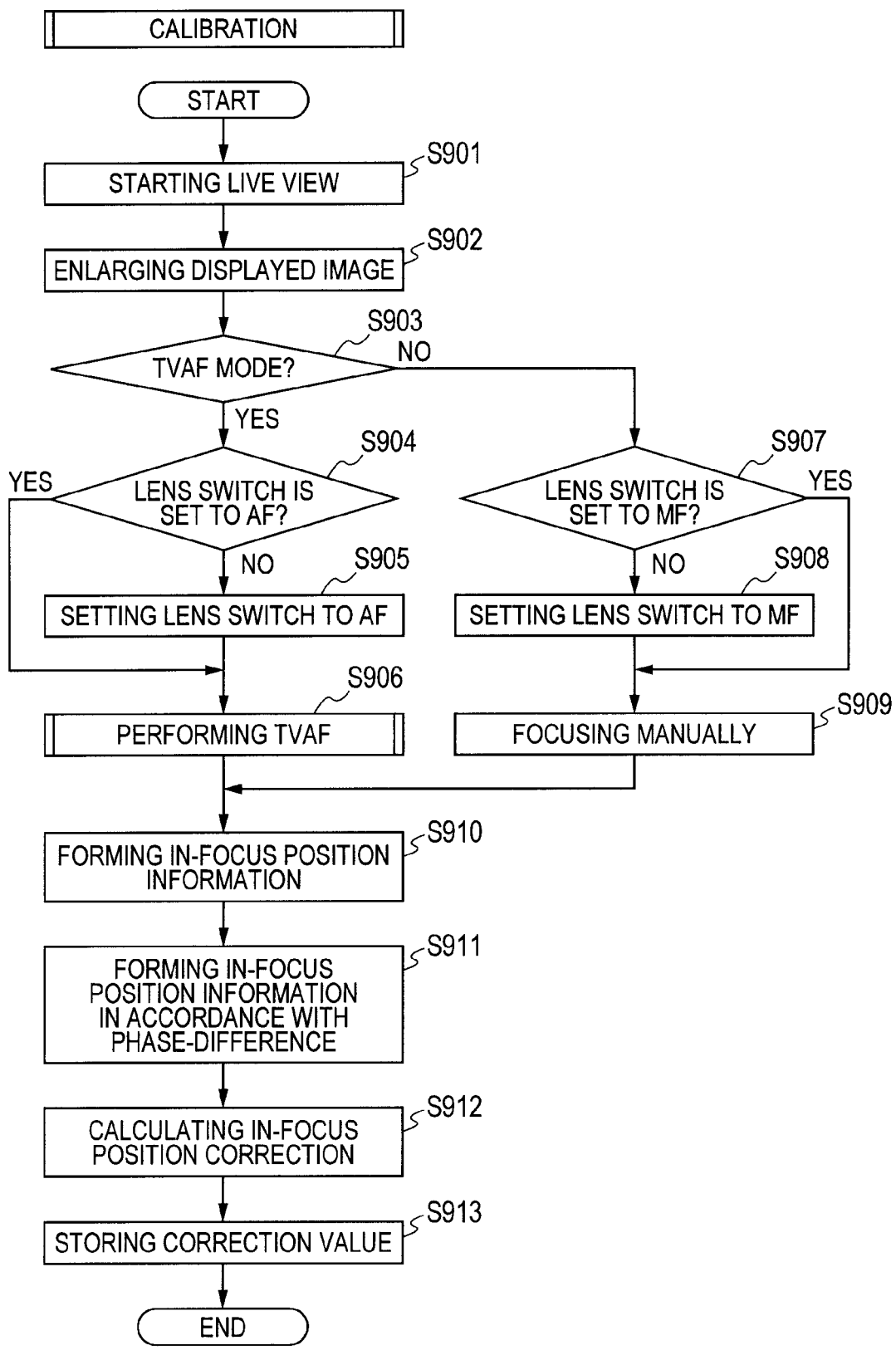
FIG. 8 is a flowchart for a calibration processing in the embodiment.
Figure 9:
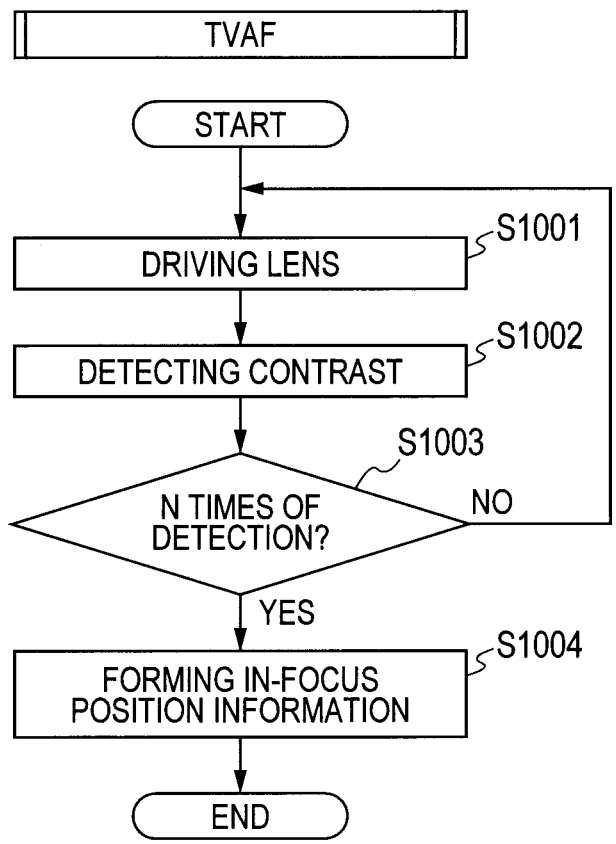
FIG. 9 is a flowchart for a TVAF (contrast AF) in the embodiment.
Figure 10:
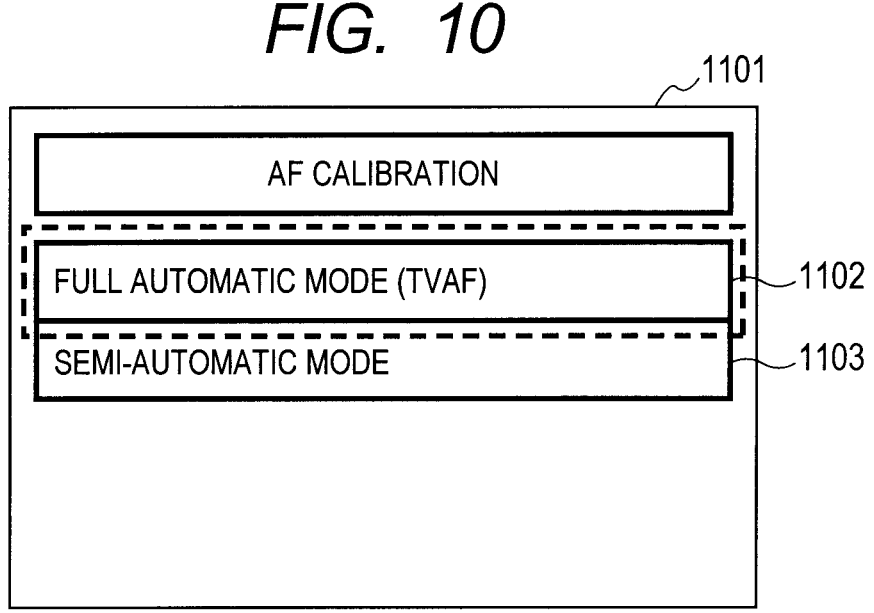
FIG. 10 is a diagram illustrating an example of a display screen of an AF calibration mode selection in the embodiment.

Subsequently, the processing for performing the calibration in the AF calibration will be described with reference to flowcharts illustrated in FIGS. 8 and 9 and an example of a display screen illustrated in FIG. 10. In this instance, the processing of step S406 in FIG. 3 will be described in detail. Since it is necessary to execute an operation for deciding an object prior to entering this flow, when the object is decided, the calibration is started. In step S901 in FIG. 8, a live view is started. Subsequently, in step S902, an image displayed by the live view is enlarged. Although it is not always necessary to enlarge it, the AF operation of a contrast detection method in step S906 or a focusing operation by the manual operation in step S909 may be executed more precisely executed if the enlargement is performed.

In step S903, when the focusing operation using the live view is executed, whether an automatic focus adjustment mode 1102 by the contrast detection method is set or a semi-automatic mode 1103 in which the user manually performs the focus adjustment is set is discriminated. The setting of the automatic focus adjustment mode 1102 by the contrast detection method and the semi-automatic mode 1103 in which the user manually performs the focus adjustment is performed by a menu screen such as an example of the display screen illustrated in FIG. 10. In FIG. 10, a setting screen 1101 is illustrated. In the "full-automatic mode (TVAF)" 1102, the automatic focus adjustment (hereinbelow, also referred to as VAF) by the contrast detection method is used in the calibration processing. In the "semi-automatic mode" 1103, the user manually performs the focus adjustment (hereinbelow, also referred to as a manual focus) in the calibration processing.

If it is determined in step S903 that the TVAF is used, step S904 follows. If it is determined that the manual focus is used, step S907 follows. In step S904, lens information is obtained by the communication with the lens body 1. The lens information is information of a lens switch (AF/MF change-over switch). Although the lens information is obtained by the communication with the lens body 1 and the camera body 2 here, it is also possible to construct in such a manner that information is obtained by precedently performing the communication and stored in the camera storage unit 42 and the stored information is used. By the obtained lens information, whether the lens switch is set to AF or MF is discriminated. If the lens switch is set to AF, step S906 follows. If the lens switch is set to MF, the lens switch is changed to AF in step S905 and, thereafter, step S906 follows. As for the lens switch, a case where the camera automatically changes the lens switch and a case where the user manually changes the lens switch are considered. When the user executes the operation for setting the lens switch to AF, a message showing that the lens switch is changed to AF is displayed on the liquid crystal monitor 43. In step S906, the TVAF is executed. The TVAF processing in step S906 will be described hereinafter with reference to FIG. 9. If the TVAF is executed in step S906, step S910 follows.

In step S907, the lens information is obtained by the communication with the lens body 1. The lens information is the information of the lens switch. Although the lens information is also obtained here by the communication with the lens body 1 and the camera body 2 here, it is also possible to construct in such a manner that information is obtained by precedently performing the communication and stored in the camera storage unit 42 and the stored information is used. By the obtained lens information, whether the lens switch is set to AF or MF is discriminated. If the lens switch is set to MF, step S909 follows. If the lens switch is set to AF, the lens switch is changed to MF in step S908 and, thereafter, step S909 follows. As for the lens switch, a case where the camera automatically changes the lens switch and a case where the user manually changes the lens switch are considered. When the user executes the operation for setting the lens switch to MF, a message showing that the lens switch is changed to MF is displayed on the liquid crystal monitor 43. In step S909, the user performs the focus adjustment on the live view by rotating a focus ring of the lens. By enlarging the image in step S902, the user can perform the focus adjustment operation more comfortably and more precisely. If the user manually performed the focus adjustment in step S909, step S910 follows.

In step S910, the mechanism control unit 40 obtains the position information from the lens state detection unit 12 at that time through the lens control unit 13 and forms focus position information. In step S911, the lens control unit 13 allows the AF sensor 22 to perform the focus detection by the phase difference AF. A detection result at that time, that is, a value obtained by converting a focus deviation amount (defocus amount) into a drive amount in the focus direction of the focus lens is added to the focus position information from the lens state detection unit 12, thereby forming focus position information. Then, step S912 follows. In step S912, the mechanism control unit 40 allows the digital control unit 41 to calculate a focus position correction value serving as a difference between the focus position information at the time when the in-focus state is determined by the digital control unit 41 and the focus position information obtained from the detection result by the AF sensor 22. After that, step S913 follows. In step S913, the focus position correction value calculated by the digital control unit 41 is stored into the camera storage unit 42. The processing routine is finished.

Subsequently, the TVAF will be described with reference to a flowchart illustrated in FIG. 9. In this instance, the processing of step S906 in FIG. 8 will be described in detail. In step S1001, the mechanism control unit 40 sends a signal to the lens control unit 13 and allows the lens drive unit 11 to move the focus lens to a predetermined position, then step S1002 follows. In step S1002, a contrast of the image signal obtained from the image pickup element 24 is detected by the digital control unit 41 and step S1003 follows. In step S1003, the very small movement of the focus lens in step S1001 and the contrast detection in step S1002 are repeated. When the number of times of repetition reaches a predetermined value, step S1004 follows. If the number of repetition times does not reach the predetermined value, step S1001 follows. In step S1004, the digital control unit 41 determines that the focus position at which the image signal of the highest contrast is obtained among N contrast detection results is the in-focus position, and sends the signal to the mechanism control unit 40. The mechanism control unit 40 obtains the position information from the lens state detection unit 12 at that time through the lens control unit 13, thereby forming the focus position information.

Figure 11:
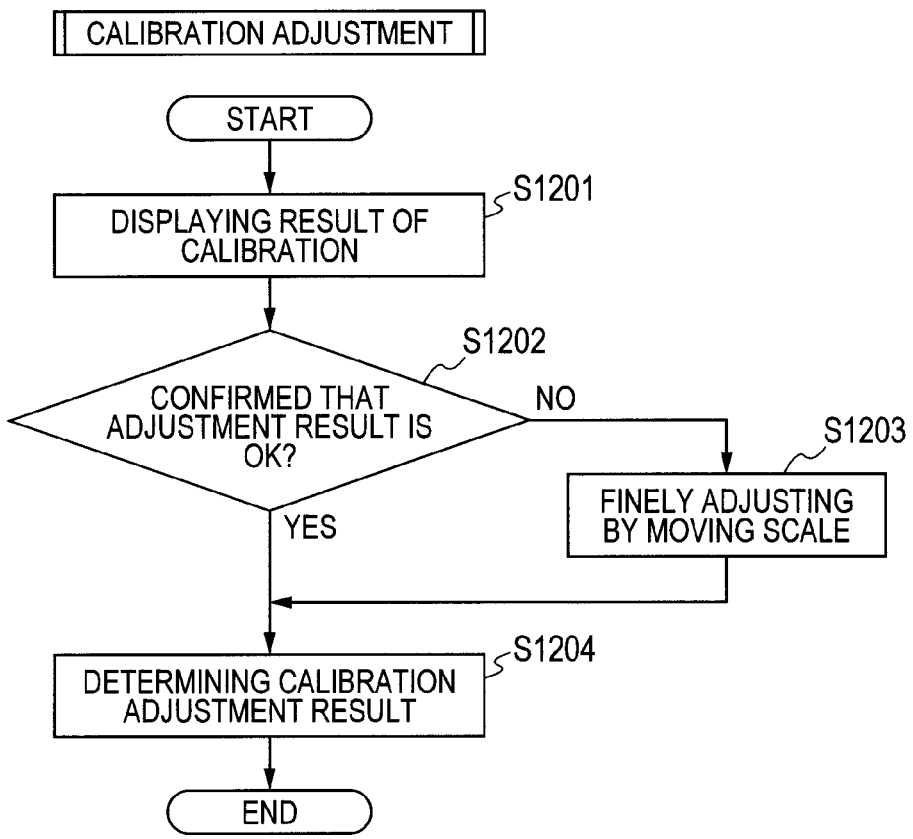
FIG. 11 is a flowchart for calibration adjustment in the embodiment.
Figure 12:
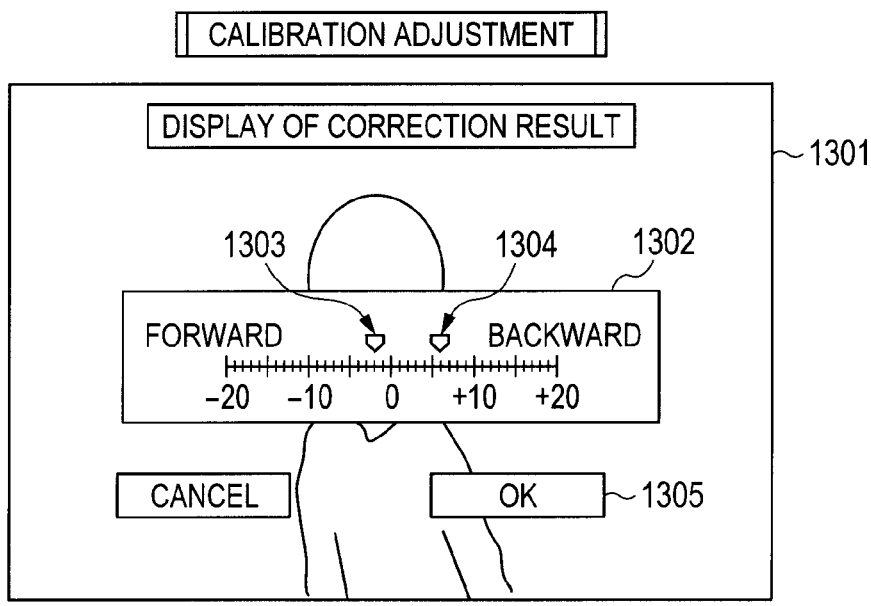
FIG. 12 is a diagram illustrating an example of a display screen of the calibration adjustment in the embodiment.

Subsequently, the adjustment of the calibration result will be described with reference to a flowchart illustrated in FIG. 11 and an example of a display screen illustrated in FIG. 12. In this instance, the processing of step S407 in FIG. 3 will be described in detail. In step S1201, a result of the calibration is displayed. An example of a display screen is shown at 1301 in FIG. 12. A whole display screen 1301 and a scale 1302 to indicate an adjustment result are displayed. When the calibration result is displayed, step S1202 follows. In step S1202, the user confirms whether or not the adjustment result is satisfactory (OK). If it is satisfactory, step S1204 follows. If it is determined that there is yet room for improvement, step S1203 follows. In step S1203, the user makes fine adjustment by moving the scale displayed at 1302. An original scale 1303 and a scale 1304 on the movement destination side are shown. If the fine adjustment is finished, step S1204 follows. In step S1204, a result of the calibration adjustment is decided by selecting an OK button 1305.

In the first embodiment described above, in step S705 in FIG. 6, when the AF frame is selected, the AF frame which is used at the time of photographing and the AF frame which is not used are made distinguishable by the processings of steps S703 and S704. Therefore, the user can rapidly select the AF frame which is subjected to the AF calibration without a moment's hesitation. On the other hand, even if the user selects the AF frame which is not used at the time of photographing, by expressing it in a display manner different from that of a normal focus (identifying expression), the user can be easily aware of the erroneous selection and can easily prevent an operation mistake. Particularly, even when the number of AF frames in which the in-focus position can be corrected or adjusted is large, the user is enabled to comfortably set the correction value. In the case of the AF frame which is not allowed to be selected in the actual photographing, by causing the AF calibration not to be performed either, such a situation that the AF is performed based on the wrong correction value can be prevented.

Second Embodiment

Figure 13:
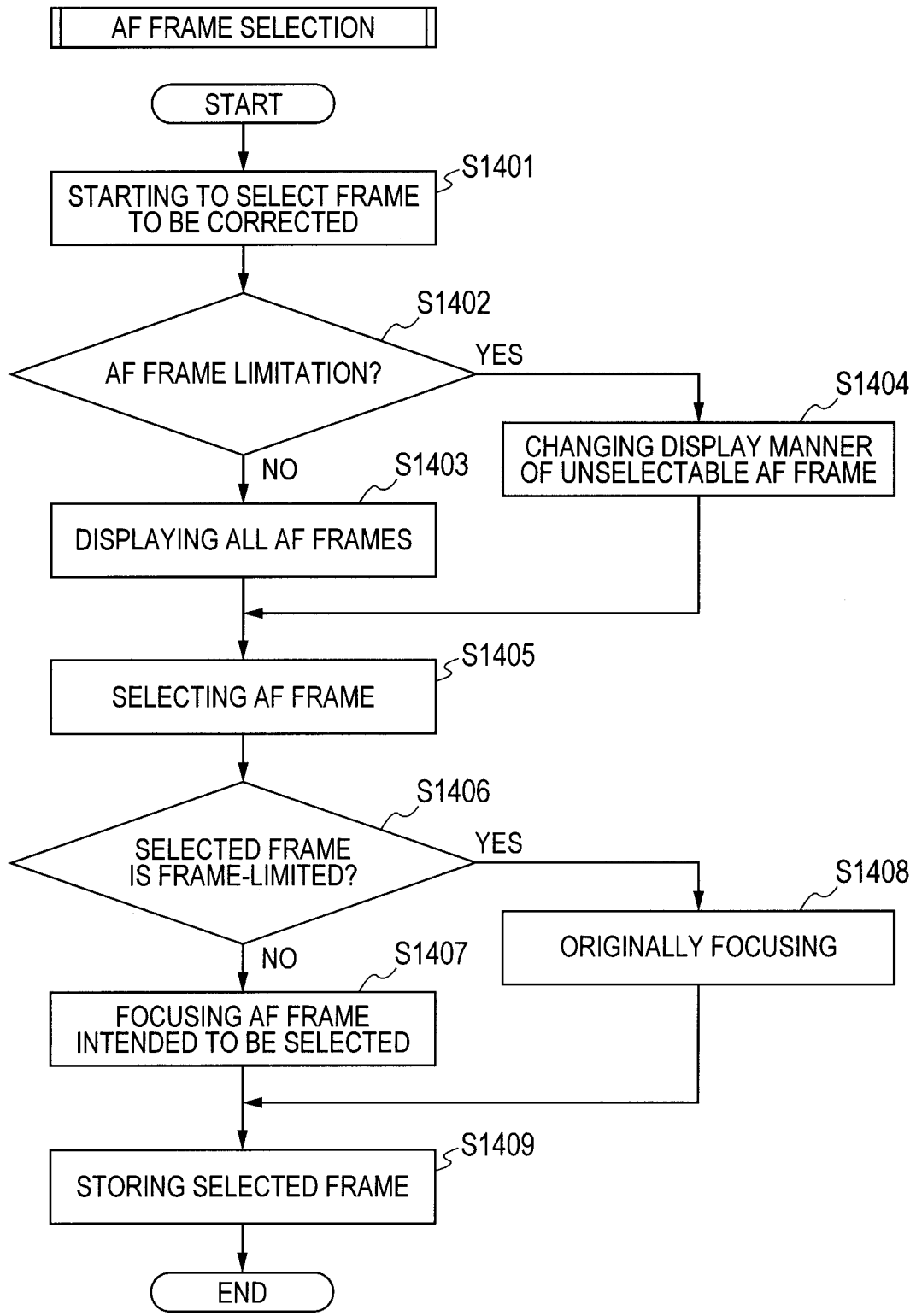
FIG. 13 is a flowchart for an AF frame selection of an AF calibration in the second embodiment.

The second embodiment will now be described. The second embodiment differs from the first embodiment with respect to the selection of the AF frame in steps S707 and S708 in FIG. 6. A different point will be described with reference to FIG. 13. It is assumed that portions other than portions which will be described with reference to FIG. 13 are substantially the same as those in the first embodiment. In FIG. 13, since processings in steps S1401 to S1405 and S1409 are substantially the same as those in steps S701 to S705 and S709 in FIG. 6, their description is omitted here.

In step S1406, whether or not the selected AF frame is an unselectable frame subjected to the AF frame limitation at the time of photographing is discriminated. If it is determined in step S1406 that the limitation processing of the AF frame is performed, step S1408 follows. If it is determined in step S1406 that the limitation processing of the AF frame is not performed, step S1407 follows. In step S1407, the focusing is applied to the AF frame which the user intends to select, thereby setting into a new selected AF frame. After completion of the processing, step S1409 follows. In step S1408, since the AF frame which the user intends to select is the unselectable frame subjected to the limitation processing at the time of photographing, the focusing in the original AF frame is held as it is. That is, even if the user tries to select the AF frame other than the selectable AF frame, such an AF frame cannot be selected and displayed. After completion of the processing, step S1409 follows.

In the second embodiment, when the AF frame is selected, the AF frames which are not used at the time of photographing cannot be selected by the processings of steps S1407 and S1408. Therefore, the user can rapidly select the AF frame to be subjected to the AF calibration without a moment's hesitation.

As for the processings of the embodiments mentioned above, a storage medium in which a program code of software embodying each function has been recorded may be provided to a system or apparatus. A computer (or a CPU or MPU) of the system or apparatus reads out and executes the program code stored in the storage medium, so that the functions of the embodiments mentioned above can be realized. In this case, the program code itself read out of the storage medium realizes the functions of the embodiments mentioned above. The storage medium in which the program code has been stored constructs the invention. As a storage medium for supplying such a program code, for example, a floppy (registered trademark) disk, a hard disk, an optical disk, a magnetooptic disk, or the like can be used. Or, a CD-ROM, a CD-R, a magnetic tape, a non-volatile memory card, a ROM, or the like can be also used. The invention incorporates not only a case where the functions of the embodiments mentioned above are realized by a method whereby a computer executes the read-out program code but also a case where an OS (Operating System) or the like which operates on the computer executes a part or all of actual processings on the basis of instructions of the program code and the functions of the embodiments mentioned above are realized by those processings. Further, the invention incorporates a case where the program code read out of the storage medium may be written into a memory provided for a function expanding board inserted in the computer or a function expanding unit connected to the computer, after that, a CPU or the like provided for the function expanding board or the function expanding unit executes a part or all of the actual processings on the basis of the instructions of the program code, and the functions of the embodiments mentioned above are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-100801 filed on Apr. 28, 2011, which is hereby incorporated by reference herein in its entirety.

What is claimed is:

1. An image pickup apparatus arranged to set a correction value, with respect to each focus adjustment area, for adjusting an in-focus position obtained by a focus detection operation using a predetermined detection method for photographing, comprising:
 a limitation processing unit configured to execute a limitation processing of focus adjustment areas which are selectable to perform the focus detection operation for photographing from among a plurality of focus adjustment areas for the focus detection operation using the predetermined detection method; and
 a display control unit configured to display a selectable focus adjustment area and an unselectable focus adjustment area on a display unit in a different display manner in accordance with a result of the execution of the limitation processing when a focus adjustment area for setting the correction value is selected,
 wherein, when photographing is performed, the in-focus position obtained by the focus detection operation is corrected based on the correction value set in advance corresponding to the focus adjustment area which is used for the focus detection operation.

2. An apparatus according to claim 1, further comprising:
 a first focus detection unit configured to perform a focus detection operation by a contrast detection method; and
 a second focus detection unit configured to perform a focus detection operation by a phase difference detection method as the predetermined detection method,
 wherein the correction value is calculated by using a difference between focus position information by the phase difference detection method and focus position information by the contrast detection method and is set.

3. An apparatus according to claim 1, wherein the correction value is manually set by the user.

4. An apparatus according to claim 1, wherein
 the selectable focus adjustment area is selectable to perform the focus detection operation by the predetermined detection method and the unselectable focus adjustment area is not selectable to perform the focus detection operation by the predetermined detection method.

5. An image pickup apparatus arranged to set a correction value, with respect to each focus adjustment area, for adjusting an in-focus position obtained by a focus detection operation using a predetermined detection method for photographing, comprising:
 a limitation processing unit configured to execute a limitation processing of focus adjustment areas which are selectable to perform the focus detection operation for photographing from among a plurality of focus adjustment areas for the focus detection operation using the predetermined detection method; and
 a display control unit configured to display a selectable focus adjustment area and an unselectable focus adjustment area on a display unit by applying a same limitation as the limitation processing when a focus adjustment area for setting the correction value is selected,
 wherein, when photographing is performed, the in-focus position obtained by the focus detection operation is corrected based on the correction value set in advance corresponding to the focus adjustment area which is used for the focus detection operation.

6. An apparatus according to claim 5, further comprising:
 a first focus detection unit configured to perform a focus detection operation by a contrast detection method; and
 a second focus detection unit configured to perform a focus detection operation by a phase difference detection method as the predetermined detection method,
 wherein the correction value can be calculated by using a difference between focus position information by the phase difference detection method and focus position information by the contrast detection method and can be set.

7. An apparatus according to claim 5, wherein the correction value is manually set by the user.

8. A control method of an image pickup apparatus arranged to set a correction value, with respect to each focus adjustment area, for adjusting an in-focus position obtained by a focus detection operation using a predetermined detection method for photographing, comprising the steps of:
 executing a limitation processing of focus adjustment areas which are selectable to perform the focus detection operation for photographing from among a plurality of focus adjustment areas for the focus detection operation using by the predetermined detection method; and
 displaying a selectable focus adjustment area and an unselectable focus adjustment area on a display unit in a different display manner in accordance with a result of the execution of the limitation processing when a focus adjustment area for setting the correction value is selected,
 wherein, when photographing is performed, the in-focus position obtained by the focus detection operation is corrected based on the correction value set in advance corresponding to the focus adjustment area which is used for the focus detection operation.

9. A control method of an image pickup apparatus arranged to set a correction value, with respect to each focus adjustment area, for adjusting an in-focus position obtained by a focus detection operation using a predetermined detection method for photographing, comprising the steps of:
 executing a limitation processing of focus adjustment areas which are selectable to perform the focus detection operation for photographing from among a plurality of focus adjustment areas for the focus detection operation using the predetermined detection method; and
 displaying a selectable focus adjustment area and an unselectable focus adjustment area on a display unit by applying a same limitation as the limitation processing when a focus adjustment area for setting the correction value is selected,
 wherein, when photographing is performed, the in-focus position obtained by the focus detection operation is corrected based on the correction value set in advance corresponding to the focus adjustment area which is used for the focus detection operation.

10. A non-transitory computer-readable storage medium storing a computer program comprising a program code for executing the control method according to claim 8.

11. A non-transitory computer-readable storage medium storing a computer program comprising a program code for executing the control method according to claim 9.

* * * * *